United States Patent
Hashimoto

[15] 3,684,163
[45] Aug. 15, 1972

[54] ROTOR DEVICE HOUSING FOR ANALYTICAL ULTRACENTRIFUGE

[72] Inventor: Takesaburo Hashimoto, Katsuta-shi, Japan

[73] Assignee: Hitachi-Ltd., Tokyo, Japan

[22] Filed: Nov. 28, 1969

[21] Appl. No.: 880,756

[30] Foreign Application Priority Data

Dec. 2, 1968    Japan ..................... 43/104329

[52] U.S. Cl. .................................... 233/1 B, 49/276
[51] Int. Cl. .... B01d 21/26, B01d 43/00, B01d 45/12
[58] Field of Search .......... 233/1, 11, 19, 20 A, 21, 7, 233/1 B, 1 R; 312/325, 138; 49/478, 276

[56] References Cited

UNITED STATES PATENTS

| | | | |
|---|---|---|---|
| 2,785,765 | 3/1957 | Cornell | 233/21 X |
| 3,103,489 | 9/1963 | Pickles | 233/21 |
| 3,148,146 | 9/1964 | Asnes et al. | 233/11 |

*Primary Examiner*—Jordan Franklin
*Assistant Examiner*—George H. Krizmanich
*Attorney*—Craig, Antonelli & Hill

[57] ABSTRACT

A rotor is accommodated and supported in a rotor chamber for high speed rotation therein. The wall of the rotor chamber is formed with an opening larger than the rotor and the opening is air-tightly closed with a cover. When the rotor is to be exchanged, the cover is removed and the rotor is exchanged through the opening.

4 Claims, 5 Drawing Figures

INVENTOR
TAKESABURO HASHIMOTO

PATENTED AUG 15 1972 3,684,163

INVENTOR
TAKESABURO HASHIMOTO

BY
ATTORNEYS

ROTOR DEVICE HOUSING FOR ANALYTICAL ULTRACENTRIFUGE

BACKGROUND OF THE INVENTION

1. Field of the Invention

The present invention relates to a rotor device for an analytical ultracentrifuge and more particularly to a rotor device for an analytical ultracentrifuge of the type which is used for determining the physical quantity, such as the molecular weight, of the molecule of a solute in a sample material, such as a mixed solution of high molecular weight substances, by imparting an ultracentrifugal force to said simple material to cause the molecules of said solute to settle, measuring the state of settling relative to time by an optical method called Schlielen method or Rayleigh's interference method, and determining the physical quantity of said solute molecules from the measurement result.

2. Description of the Prior Art

The so-called analytical ultracentrifuge of the type described is used in the purification or concentration, for example, of high molecular weight substances, colloids, viruses, proteins, enzymes, etc. The principle and the practical construction of such analytical ultracentrifuge are described in detail, for example, in U.S. Pat. No. 2,608,344 granted to Edward G. Pickels et al. on Aug. 26, 1952 for "Centrifuge Construction with Semiautomatic Controls for a Movable Vacuum Chamber."

In the analytical ultracentrifuge of the type described, a sample material to be analyzed is supported on a portion of a rotor. In practice, the sample material is usually charged in a sample cell which is carried on a portion of the rotor. In order to impart a strong centrifugal force to the sample material, the rotor is rotated at the rate of several thousands to several tens of thousand revolutions per minute. The rotor is rotated in a high degree of vacuum so as to avoid the resistance of air to the rotating rotor and to prevent the rotating rotor from being heated by the resistance of air. Since the rotor is rotated at a high seed in vacuum, the rotor chamber must be of extremely rigid construction to protect the operator against a casual accident.

On the other hand, the necessity of changing the sample material, the sample cell or the rotor arises frequently. By this reason, the following construction is commonly employed. Namely, the rotor is suspended from a fixed plate in such a manner that it is rotatable at high speeds and is disposed in a rotor chamber which is defined by said fixed plate and a container open at the top end thereof. The container is supported by three screws so as to be movable vertically and a chain is engaged around these three screws so that when one of them is rotated, the other two may be rotated concurrently. The aforesaid one of the three screws, which is selected optionally, is operatively connected to a motor through a complicate reduction gearing. The fixed plate and the container are coupled through a vacuum seal because the rotor chamber must of course be maintained highly vacuum. For changing the sample material, the sample cell or the rotor, the vacuum in the rotor chamber is broken and the motor is set in motion to drive the aforesaid optional one of the three screws through the complicate reduction gearing. As a result, the other two screws are also driven by means of the chain. The container is lowered as the three screws are driven. Of course, the container is lowered to such a level as will provide for the exchange of the sample material, the sample cell or the rotor. When the fixed plate and the container are desired to be united again upon completion of the exchanging operation, the motor is driven in a reverse direction.

In using the analytical ultracentrifuge, the sample material mounted on the rotor must cross an optical axis, during high speed rotation of the rotor, for enabling the ultracentrifugal analysis of the sample material to be attained. In practice, therefore, lenses are provided on the fixed plate for the passage of a light along said optical axis.

However, the conventional analytical ultracentrifuge as briefly described above has the following disadvantages:

1. Since the drive of the motor is transmitted to the three screws through the complicate gearing and the heavy container is moved up and down by the rotation of these screws, the speed of vertical movement of the container must be made slow and, therefore, the efficiency of the sample material, sample cell or rotor changing operation is very low.

2. The operation of moving the rotor up and down is accompanied by an extremely large noise.

3. The vacuum seal used to provide for air-tight coupling of the fixed plate and the container serves simultaneously as a buffer to absorb the shock which the container and the fixed plate undergo from each other when said container is coupled with said fixed plate after it is slowly moved upward. In practice, however, the shock cannot completely be absorbed by the vacuum seal and it has frequently been experienced that the optical axis was deviated due to displacement of the lenses or the air-tight sealing effect of the vacuum seal was impaired due to relative displacement of the fixed plate and the container.

4. Since the motor, the reduction gearing and the three screws must be provided for the operation of changing the sample material, the sample cell or the rotor, the analytical ultracentrifuge is highly complicate in construction, expensive and relatively short in service life.

SUMMARY OF THE INVENTION

An object of the present invention is to provide a rotor device for use in an analytical ultracentrifuge, which enables the rotor exchanging operation to be accomplished quickly.

Another object of the invention is to provide a rotor device for an analytical ultracentrifuge, which does not create a noise.

Still another object of the invention is to provide a rotor device for an analytical ultracentrifuge, which is not subject to a shock at any portion thereof.

A further object of the invention is to provide a rotor device for an analytical ultracentrifuge, which is simple in construction, long in service life and low in cost.

According to an aspect of the present invention, there is provided a rotor device for use in an analytical ultracentrifuge, which comprises a rotor to hold a sample material to be subject to an optical analysis, a rotor chamber for accommodating said rotor, an opening formed in a portion of the wall of said rotor chamber in size large enough to permit said rotor to be freely moved into and out of the rotor chamber therethrough, and a cover to open and close said opening.

Other objects, features and advantages of the present invention will be readily apparent from the following detailed description of a preferred embodiment taken in conjunction with the accompanying drawings.

DESCRIPTION OF THE PREFERRED EMBODIMENT

Figure 1:
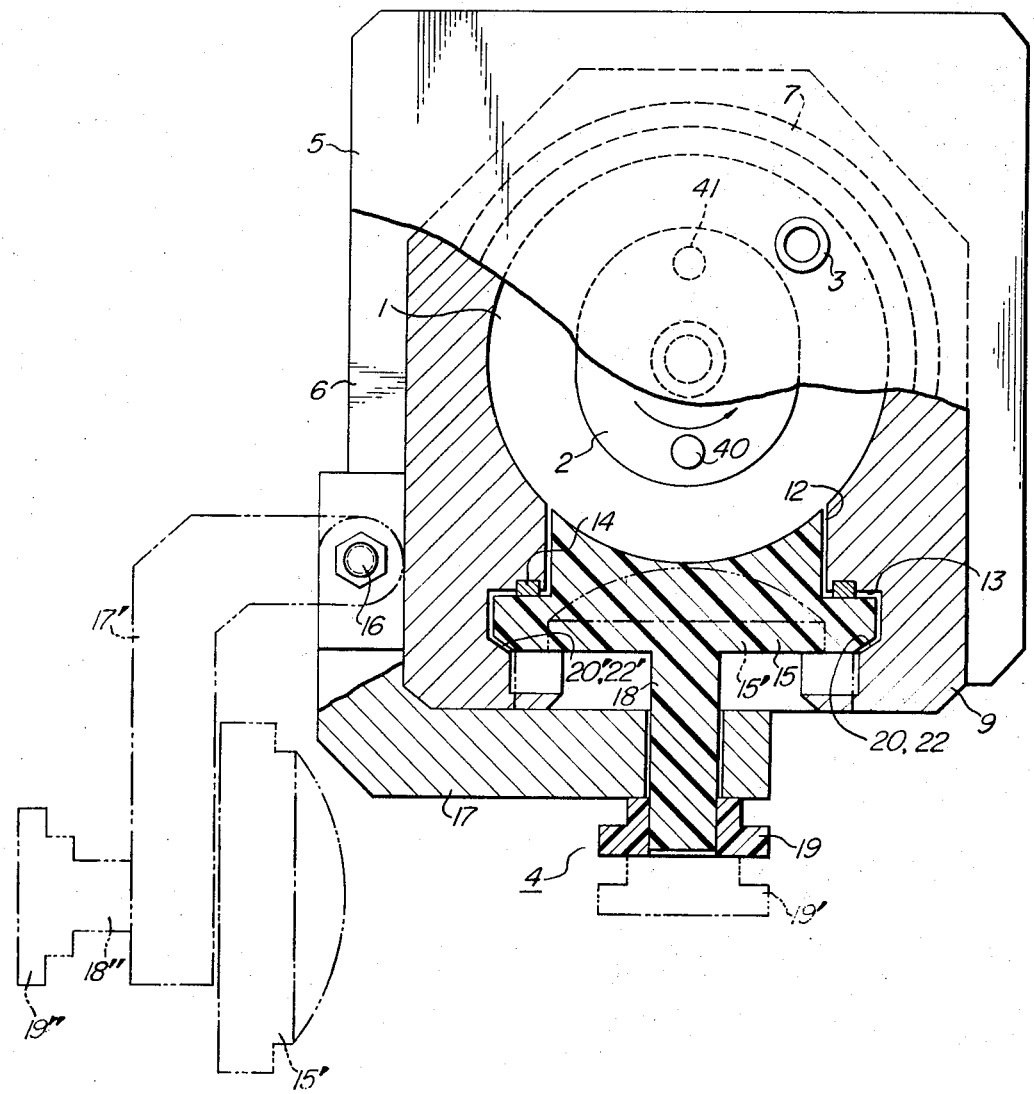
FIG. 1 is a plan view, partially in section, of an embodiment of the rotor device for use in an analytical ultracentrifuge.

The rotor device for use in an analytical ultracentrifuge, according to the present invention, is composed of a rotor chamber 1, a rotor 2, means 3 for bleeding air from said rotor chamber and closure means 4. The rotor chamber 1 is defined by an upper plate 5, a lower plate 6 and a cylinder 9 which has the upper and lower ends tightly fitted to the upper plate 5 and the lower plate 6 respectively by means of a conventional method, such as of screws, with vacuum seals 7 and 8 interposed therebetween. The transverse cross-sectional shape of the cylinder 9 is optional but is circular in the embodiment shown. The rotor 2 is accommodated in the rotor chamber 1 and suspended centrally of the upper plate 5 by a rotor shaft 11 to which it is connected through a joint 10 and by which it is rotated at a high seed. The construction of the joint 11 and the practical and supporting means for the rotor 2 are the same as in the conventional ultracentrifuge and, therefore, not apparent in the illustration. The closure means 4 includes a circular opening 12 formed in a portion of the cylinder 9 which constitutes the wall of the rotor chamber 1, an annular seat 13 formed along the edge of said opening 12, a closure member 15 which is brought into pressure engagement with the seat 13 through a vacuum seal 14 or disengaged therefrom to close or open said opening 12, and an L-shaped arm 17 pivotably connected to a portion of the outer peripheral surface of the cylinder 9 by a pin 16. The opening 12 is larger than the rotor 2. The closure member 15 has a stem 18 movably supported by the arm 17, a grip or handle 19 fixed to one end of the stem 18 and two arcuate projections 20, 20'. These arcuate projections 20, 20' are symmetrical with respect to the center 21 of the closure member 15 and each extends over a circumferential length the central angle of which is abut 90°, though not greater than 90°. The outer end of the opening 12 is formed with two arcuate projections 22, 22'. These arcuate projections 22, 22' are symmetrical with respect to the center 23 of the opening 12 and each extends over a circumferential length the central angle of which is about 90°, though not greater than 90°. The arcute projections 22, 22' are formed for engagement with the arcuate projections 20, 22' respectively and the arcuate projections 20, 20' are engaged with the surfaces of the arcuate projections 22, 22' facing the rotor chamber 1 respectively. The engaging surfaces of the arcuate projections 20, 20' and the arcuate projections 22, 22' may be horizontal but may alternatively be inclined upwardly in the directions of A – A' and B – B' respectively.

The air interior of the rotor chamber 1 is exhausted through bleeding means 3 to produce a so-called high degree of vacuum within said rotor chamber. In this case, the opening 12 is of course closed by the closure member 15. In the condition of the opening 12 being closed, the arcuate projections 20,20' are held in engagement with the arcuate projections 22, 22' respectively and the closure member 15 is strongly pushed toward the rotor chamber 1 with pressure contact with the seat 13 through the intermediary of the vacuum seal 14. The rotor 2 is driven at a high speed by the ordinary driving means when the interior of the rotor chamber 1 is maintained highly vacuum.

The rotation of the rotor 2 can be stopped and the vacuum in the rotor chamber 1 can be broken by the conventional method. When the grip 19 is rotated 90°in the direction of the arrows A, A' under such condition, the closure member 15 is also rotated through the same degrees and the engagements between the arcuate projections 20 and 22 and between the arcuate projections 20' and 22' are released. Then, the grip 19 is pulled to a position indicated by numeral 19', whereby the closure member 15 is moved to a position indicated by numeral 15'. In this case, the pressure engagement of the closure member 15 with the seat 13 through the vacuum seal 14 is of course released. Thereafter, the arm 17 is pivoted about the pin 16 to a position indicated by numeral 17', whereby the closure member 15, the stem 18 and the grip 19 are moved to positions indicated by numerals 15'', 18'' and 19'' respectively as an integral unit. Thus, the opening 12 is completely opened. Therefore, the rotor 2 can be removed to the outside of the rotor chamber 1 by extending a hand into said rotor chamber through the opening 12 and loosening the joint 10. After connecting a new rotor to the shaft 11, the opening 12 can be closed completely by the closure member 15 as shown in FIG. 1, by performing the above-described operation in an exactly reverse way. By this step, the rotor changing operation is accomplished.

In practice, a sample cell 40 having a sample material previously charged therein and a balance weight 41 to provide for smooth rotation of the rotor 2 at a high speed, are mounted on the rotor 2. It will be obvious that changing of the sample material and the sample cell 40 can be attained by exactly the same operation as described above for changing the rotor.

Figure 2:
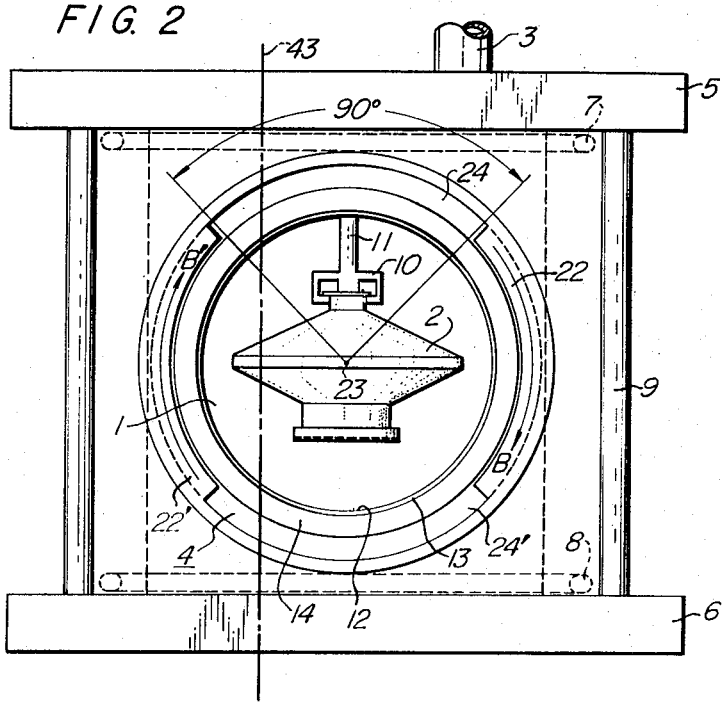
FIG. 2 is a front view of the rotor device with the closure member removed.
Figure 3:
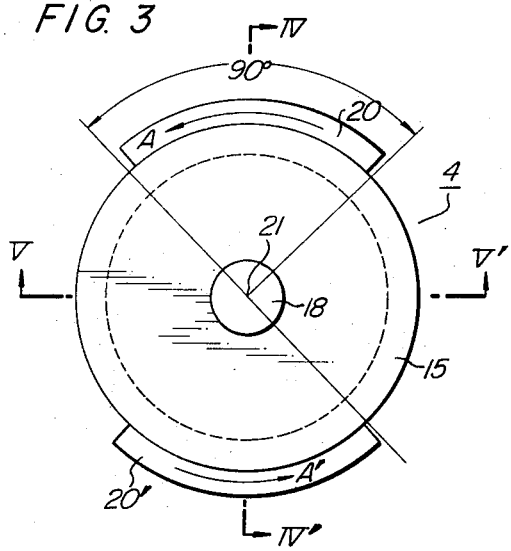
FIG. 3 is a front view of the closure member shown in FIG. 1.
Figure 4:
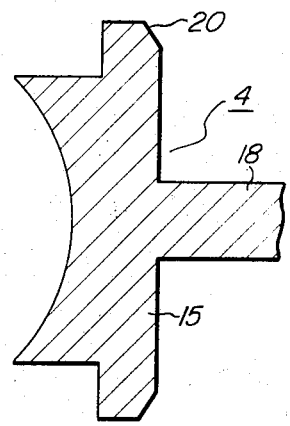
FIG. 4 is a cross-sectional view taken on the line IV–IV' IV' of FIG. 4.
Figure 5:
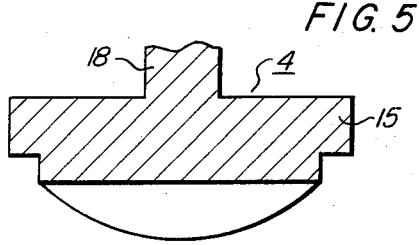
FIG. 5 is a cross-sectional view taken on the line V – V' of FIG. 3.

Inasmuch as the rotor device of the invention is intended for use in an analytical ultracentrifuge, an optical axis is needed which the sample cell crosses during high speed rotation of the rotor. Such optical axis is indicated by numeral 43 in FIG. 2. The optical axis 43 is obviously the axis along which a light passes, and to pass the light along the optical axis 43, lenses (not shown) are provided in the upper plate 5 and the lower plate 6 respectively. These lenses must be mounted in the respective plates through a suitable vacuum seal for maintaining the sealing of the rotor chamber 1 against the outside atmosphere.

It is to be noted that the following excellent advantages can be obtained by employing the rotor device of the invention described and illustrated herein:

1. The sample material, the sample cell or the rotor can be changed quickly.
2. The device generates no noise during operation.
3. The device provides no factor to cause deviation of the optical axis.
4. The device is simple in construction, long in service life and low in cost, as compared with the conventional one.

Although the embodiment described and illustrated herein has two sets of arcuate projections 20, 22 and 20', 22', the numbers of these sets of arcuate projections can be three or more. However, it is of course essential for the purpose of mutual engagement that the arcuate projections are spaced equally regardless of the number of the sets of arcuate projections. When the number of the sets of arcuate projections is three or more, the angle of rotation of the closure member 15 necessary to open the opening 12 can obviously be smaller than in case of the number of the sets of arcuate projections being two. However, it will be appreciated that the angle of rotation of the closure member 15 is within 90° whether the number of the sets of arcuate projections is two or more.

It is also to be understood that instead of forming the arcuate projections 20, 20' and 22, 22', the pressure engagement of the closure member 15 with the seat 13 through the vacuum seal 14 may be attained by forming a female thread on the peripheral wall of the opening 12 and a male thread on the peripheral wall of the closure member 15 engaged with said female threads, and forming in the male and female threads axial grooves at an equal interval (e.g., at an angular interval of about 90°).

The description set forth herein is intended to be merely illustrative of the invention and is not intended as a limitation thereto, it being understood that many and varied modifications can be made to the disclosed arrangement of elements without departing from the scope of the appended claims.

What is claimed is:

1. A rotor device for an analytical ultracentrifuge, comprising a rotor for holding a sample material to be subject to an optical analysis, a rotor chamber for supporting and accommodating said rotor for high speed rotation therein, an opening formed in a portion of the wall of said rotor chamber and having a size large enough to permit the rotor to be freely moved into and out of said rotor chamber, a seat formed at said opening, a closure member to be pressed against said seat through the intermediary of a vacuum seal, a plurality of equally spaced arcuate projections formed on said closure member, a plurality of arcuate projections provided at an end of said opening remote from said rotor chamber, each of said second arcuate projections being brought into engagement with each of said first arcuate projections upon rotation of said closure member through an angle of at most 90° whereby said closure member is brought into pressure contact with said seat with said vacuum seal intervening therebetween, and means for bleeding the air from said rotor chamber.

2. A rotor device for an analytical ultracentrifuge, comprising a rotor for holding a sample material to be subject to an optical analysis, a rotor chamber for supporting and accommodating said rotor for high speed rotation therein, an opening formed in a portion of the wall of said rotor chamber and having a size large enough to permit the rotor to be freely moved into and out of said rotor chamber therethrough, a seat formed at said opening, a closure member to be pressed against said seat through the intermediary of a vacuum seat, two arcuate projections formed on said closure member at an interval of about 90°, another two arcuate projections provided at an end of said opening remote from said rotor chamber, each of said second arcuate projections being brought into engagement with each of said first arcuate projections when said closure member is rotated through an angle of about 90° whereby said closure member is brought into pressure contact with said seat with said vacuum seal intervening therebetween, and means for bleeding the air from said rotor chamber.

3. A rotor device as defined in claim 3, wherein said closure member is movably supported by an arm which is pivotably connected to a portion of the wall of said rotor chamber.

4. A rotor device as defined in claim 3, wherein said rotor chamber is composed of an upper plate, a lower plate and a cylinder which is tightly connected to said upper and lower plates through the intermediary of a vacuum seal.

* * * * *